US006075074A

United States Patent [19]
Daly et al.

[11] Patent Number: 6,075,074
[45] Date of Patent: *Jun. 13, 2000

[54] CONTINUOUS PROCESSING OF POWDER COATING COMPOSITIONS

[75] Inventors: Andrew T. Daly, Sinking Spring; Owen H. Decker, Wyomissing; Karl R. Wursthorn, Mohnton, all of Pa.; Frank R. Houda, Wonder Lake, Ill.; Leo T. Grundowski, Reading, Pa.; Carl W. Ernst, Newmanstown, Pa.

[73] Assignee: Morton International, Inc., Chicago, Ill.

[*] Notice: This patent is subject to a terminal disclaimer.

[21] Appl. No.: 09/066,207

[22] Filed: Apr. 24, 1998

Related U.S. Application Data

[63] Continuation-in-part of application No. 08/882,669, Jun. 25, 1997, which is a continuation-in-part of application No. 08/684,112, Jul. 19, 1996, Pat. No. 5,766,522.

[51] Int. Cl.$^7$ ............................. C08J 3/12; C08L 81/06; C08L 27/18

[52] U.S. Cl. .................... 523/330; 523/333; 523/340; 524/424; 524/904; 528/501; 528/502 E; 264/13; 264/12; 239/8

[58] Field of Search ..................... 523/330, 333, 523/340; 524/424, 904; 528/501, 502 E; 264/13, 12; 239/8

[56] References Cited

U.S. PATENT DOCUMENTS

| | | |
|---|---|---|
| 2,566,292 | 8/1951 | Reese .................................... 159/4 |
| 3,166,613 | 1/1965 | Wright et al. ......................... 264/12 |
| 3,561,003 | 2/1971 | Lanham et al. ....................... 106/22 |
| 3,676,172 | 7/1972 | Van Dyk et al. ..................... 117/21 |
| 3,803,111 | 4/1974 | Munro et al. ...................... 260/89.5 |
| 3,864,322 | 2/1975 | Yallourakis ........................ 260/87.5 |
| 3,932,347 | 1/1976 | Camelon et al. ................. 260/42.14 |
| 3,943,082 | 3/1976 | Smith et al. ......................... 260/23 R |
| 3,981,957 | 9/1976 | Van Brederode et al. ........ 260/878 R |
| 4,009,131 | 2/1977 | Farone .............................. 260/23 R |
| 4,012,461 | 3/1977 | Van Brederode ................ 260/878 R |
| 4,582,731 | 4/1986 | Smith ................................... 427/421 |
| 4,649,037 | 3/1987 | Marsh et al. ........................ 423/338 |
| 4,708,967 | 11/1987 | Ferentchak et al. ................. 521/56 |
| 4,713,233 | 12/1987 | Marsh et al. ........................ 423/608 |
| 4,734,227 | 3/1988 | Smith ................................... 264/13 |
| 4,734,451 | 3/1988 | Smith ................................... 524/493 |
| 4,737,384 | 4/1988 | Murthy et al. ...................... 427/369 |
| 4,882,107 | 11/1989 | Cavender et al. .................... 264/51 |
| 4,923,720 | 5/1990 | Lee et al. ............................ 427/422 |
| 4,970,093 | 11/1990 | Sievers et al. ........................ 427/38 |
| 5,009,367 | 4/1991 | Nielsen ................................ 239/3 |
| 5,011,819 | 4/1991 | Leibovitz ............................. 505/1 |
| 5,027,742 | 7/1991 | Lee et al. ............................ 118/300 |
| 5,057,342 | 10/1991 | Hoy et al. ........................... 427/422 |
| 5,063,267 | 11/1991 | Hanneman et al. ................. 524/284 |
| 5,066,522 | 11/1991 | Cole et al. .......................... 427/422 |
| 5,088,443 | 2/1992 | Hastings et al. .................... 118/314 |
| 5,105,843 | 4/1992 | Condron et al. ..................... 137/13 |
| 5,106,650 | 4/1992 | Hoy et al. ............................ 427/27 |
| 5,106,659 | 4/1992 | Hastings et al. .................... 427/421 |
| 5,108,799 | 4/1992 | Hoy et al. ........................... 427/422 |
| 5,118,530 | 6/1992 | Hannemann et al. ............... 427/226 |
| 5,141,156 | 8/1992 | Hoy et al. ........................... 239/135 |
| 5,158,986 | 10/1992 | Cha et al. ............................ 521/82 |
| 5,170,727 | 12/1992 | Nielsen ............................... 431/2 |
| 5,171,613 | 12/1992 | Bok et al. ........................... 427/422 |
| 5,178,325 | 1/1993 | Nielsen ............................... 239/1 |
| 5,197,800 | 3/1993 | Saidman et al. ................... 366/136 |
| 5,207,954 | 5/1993 | Lewis et al. ........................ 264/13 |
| 5,211,342 | 5/1993 | Hoy et al. ........................... 239/707 |
| 5,215,253 | 6/1993 | Hoy et al. ........................... 62/50.6 |
| 5,254,260 | 10/1993 | Nielsen et al. ...................... 210/651 |
| 5,267,390 | 12/1993 | Yang et al. .......................... 29/527.4 |
| 5,270,082 | 12/1993 | Lin et al. ............................ 427/539 |
| 5,290,602 | 3/1994 | Argyropoulous et al. .......... 427/421 |
| 5,290,603 | 3/1994 | Nielsen et al. ..................... 427/421 |
| 5,290,604 | 3/1994 | Nielsen ............................... 427/421 |
| 5,290,827 | 3/1994 | Shine .................................. 523/340 |
| 5,304,390 | 4/1994 | Condron et al. ..................... 427/8 |
| 5,306,350 | 4/1994 | Hoy et al. .......................... 134/22.14 |
| 5,306,648 | 4/1994 | Fukaya et al. ...................... 437/3 |
| 5,308,647 | 5/1994 | Lappi .................................. 427/154 |
| 5,312,862 | 5/1994 | Nielsen et al. ...................... 524/552 |
| 5,319,001 | 6/1994 | Morgan et al. ..................... 523/205 |
| 5,330,783 | 7/1994 | Saidman et al. ..................... 427/8 |
| 5,334,356 | 8/1994 | Baldwin et al. .................... 422/133 |
| 5,399,597 | 3/1995 | Mandel et al. ..................... 523/342 |
| 5,461,089 | 10/1995 | Handyside et al. ................. 523/171 |
| 5,470,893 | 11/1995 | Sinclair-Day et al. .............. 523/205 |
| 5,521,253 | 5/1996 | Lee et al. ............................ 525/301 |
| 5,552,191 | 9/1996 | Horinka et al. ..................... 427/475 |
| 5,766,522 | 6/1998 | Daly et al. . |

FOREIGN PATENT DOCUMENTS

| | | |
|---|---|---|
| 0661091 | 7/1995 | European Pat. Off. ........... B01J 2/04 |
| 720999 | 7/1996 | European Pat. Off. . |
| 2853066 | 12/1978 | Germany . |
| 9200342 | 1/1992 | WIPO .............................. C08J 3/12 |
| WO 9409913 | 5/1994 | WIPO . |

OTHER PUBLICATIONS

Database WPI, Week 9628, Derwent Publications Ltd., London, GB; AN 272802, XP002079861, "High molecular fine particle solid material for powder coating", A—Abstract—JP 08 113652 A (Nippon Paint) May 7, 1996.

Powder Coating, Mar. 1996 pp. 58–63 "Emerg. Tech., Vamp Puts Pressure On Traditional Powder Coatings Production Process".

(List continued on next page.)

*Primary Examiner*—Andrew E. C. Merriam
*Attorney, Agent, or Firm*—Gerald K. White

[57] ABSTRACT

Systems, apparatus combinations and methods for producing a coating powder are provided wherein a stream of a powder coating precursor including at least one resin and at least one additional powder coating ingredient is contacted with a process fluid effective to reduce the viscosity of the powder coating precursor to allow processing of the powder coating precursor at a lower temperature.

51 Claims, 3 Drawing Sheets

OTHER PUBLICATIONS

News Release of Oct. 24, 1995 "Ferro Corporation Develops New Powder Coatings Manufacturing Process".

Chem. Engin., Mar. 1994, pp. 32–35 "New Roles for Supercritical Fluids".

Design and Control of $Co_2$ Extraction Plants presented at the 2nd Interstructural Symposium on Supercritical Fluids, May 20–22, 1991, Boston, MA by Marc Sims and Terry Thompson.

Chapter 23, Solids Formulation After the Expansion of Supercritical Mixtures; Mohamed,Rahoma S., Halverson, Duane S., Debenedetti, Pablo G., Prud'homme, Robert K., American Chemical Society, Copyright 1989, Department of Chemical Engineering,; Princeton Univ., pp. 355–378.

Production of Powders and Films by the Rapid Expansion of Supercritical Solutions—D.W. Matson, R.C. Petersen & R.D. Smith—Journal of Material Science, vol. 22, 1987 pp. 1919–1928.

Higher Solids Coatings Above 80% By Volume—W. Cobbs, B. Rehman and J. Kirchner, presented at the Water–Borne & Higher Solids Coatings Symposium, Mar. 10–20, 1980.

Chemical Abstracts: 116:22094x Analysis for poly (vinyl chloride) additives by supercritical fluid extraction and supercritical fluid chromatography, (1992).

Chemical Abstract 115:233719x, Purification of latex, (1991).

Chemical Abstract: 114:146198g, Supercritical fluid and near critical gas extraction of organic solvents from formed articles, (1991).

Chemical Abstract: 111:195568g, Residual isocynate monomer extraction with liquid or supercritical carbon dioxides, (1989).

Chemical Abstract: 109–211647y, Process for the purification of styrene–vinyl pyridine copolymers by extraction using a supercritical gas, (1998).

Brochure—Supercritical Fluid—Process Development Unit—Marc Sims SFE, (No Date Available).

CONTINUOUS PROCESSING OF POWDER COATING COMPOSITIONS

This application is a C-I-P of U.S. Ser. No. 08/882,669, filed Jun. 25, 1997; which is a C-I-P of U.S. Ser. No. 08/684,112, filed Jul. 19, 1996, now U.S. Pat. No. 5,766,522.

BACKGROUND OF THE INVENTION

This invention relates generally to powder coatings and, more particularly, to the continuous processing of powder coatings.

Because of increased environmental concerns, much effort has been directed to the problem of reducing pollution caused by the evaporation of solvents from paints. These efforts have led to the development of new coating technologies which eliminate or at least diminish the emission of organic solvent vapors into the atmosphere. Since the mid-1950's, the powder coating technology has been one of the most successful developments in terms of reducing or eliminating solvent vapor emissions.

The use of powder coating compositions can be extremely desirable as such compositions are essentially free of organic solvents such as are conventionally present in liquid paint systems. Accordingly, economic and social benefits such as reductions in air pollution, energy requirements, and fire and health hazards can be realized through the use of powder coatings.

A common technique for applying a powder coating to an object makes use of electrostatic powder spray coating equipment. In such application, a coating powder is dispersed in an airstream and passed through a high voltage field whereby the coating particles attain an electrostatic charge. These charged particles are attracted to and deposited on the object to be coated which is usually at room temperature. Subsequently, the object is placed in an oven and heated whereby the powder melts/cures to form the desired coating on the object.

U.S. Pat. No. 5,009,367 to Nielsen, U.S. Pat. No. 5,027,742 to Lee et al., and "HIGHER SOLIDS COATINGS ABOVE 80% BY VOLUME," presented at the Water-Borne & Higher Solids Coatings Symposium, Mar. 10–12, 1980, all concern the spraying of materials using supercritical fluids.

Further, based on U.S. Pat. No. 5,158,986 to Cha et al., U.S. Pat. No. 5,334,356 to Baldwin et al., and the article entitled, "NEW ROLES FOR SUPERCRITICAL FLUIDS," appearing in *Chemical Engineering*, March 1994 (pages 32–35), it is known to feed fluids, including supercritical $CO_2$, to an extruder to form an extruded shape of a fluid and polymer plastic material. As disclosed, such extruded material can subsequently be processed to form a desired supermicrocellular, foamed material, such as in the form of a sheet.

Conventionally, the manufacture of a powder coating comprises melt-mixing a resin, a curing agent, plasticizers, stabilizers, flow aids, pigments, and extenders. Whereas dry blending is commonly used to make PVC powders under conditions not amenable to the formation of very fine powders, melt-mixing involves the high speed, high intensity mixing of dry ingredients in a Henschel mixer or the like and then the heating of the mixture to an elevated temperature (e.g., about 180–250° F.) in a continuous compounder such as a single or twin screw extruder to achieve thorough dispersion of the other ingredients in the resin as the resin melts, forming a molten mixture. The molten mixture is then cooled to quench the reaction and crushed. Such processing is then generally followed by a sequence of operations which can involve grinding, sifting, separation, and filtering, followed by more sieving.

Such manufacture and processing of coating powders, however, are subject to a number of shortcomings or difficulties. For example, high temperature processing of ingredients in a melt extruder can bring about premature reaction of the resin with the curing agent or degradation of at least some polymer resins.

Additionally, the particles produced as a result of such crushing and grinding operations are generally substantially non-spherical, irregularly shaped. Such irregularly shaped particles can have an undesirable effect on the uniformity and continuity of any resulting coating formed on a substrate surface as a result of application and curing of such a powder coating.

Furthermore, the particles produced by such conventional manufacture processing tend to vary greatly in size. Consequently, various particle separation techniques such as screening and cyclone separation can be required in order to separate undesirable large and small particles from the powder particles having the desired size distribution. The powder particles which are undesirably sized must then typically be downgraded or otherwise disposed of.

In the past, various approaches have been proposed in order to overcome or minimize some of the above-identified problems.

U.S. Pat. No. 5,207,954 to Lewis et al. discloses a method of making a thermosettable, coreactable particulate powdered composition of a first copolymer of an olefinically unsaturated monomer having at least one functional group and at least a second copolymer of an olefinically unsaturated monomer having at least one functional group which is reactive with the functional group of the first copolymer. Aqueous dispersions containing the coreactive polymers are disclosed as being spray dried to produce copolymeric particles which are substantially uniform and spherical in shape.

U.S. Pat. Nos. 4,582,731 and 4,734,451, both to Smith, disclose methods and apparatus for the deposition of thin films and the formation of powder coatings through the molecular spray of solutes dissolved in organic and supercritical fluid solvents. The examples disclose the application of single component films to substrate surfaces. These patents do not appear to disclose coating materials composed of multiple components or materials, or the processing thereof.

U.S. Pat. No. 5,290,827 to Shine concerns a process for preparing a homogeneous blend of otherwise thermodynamically immiscible polymers, rather than resins with or without a curing agent. In accordance with the disclosure, mixtures of polymers are dissolved under pressure in supercritical fluid solvents and then expanded through a fine nozzle. As the supercritical fluid solvent evaporates, the polymer mixture is disclosed as depositing as a substantially homogeneous blend.

U.S. Pat. No. 5,399,597 to Mandel et al. discloses a batch process for preparing powder coating materials whereby at least some of the above-identified problems are sought to be minimized or avoided. In accordance with the process thereof, different first and second organic materials and a supercritical fluid are mechanically agitated in a first container. The contents of the fs first container are then discharged into a second container, maintained at a lower pressure than the first container, and in which substantially all of the first and second organic materials are collected.

Such batch processing can suffer from a number of shortcomings. For example, batch processing can undesirably result in long cycle times which, for example, can cause undesired polymerization of fast curing powder coating compositions. Further, batch processing can lead to product inconsistencies, such as inconsistencies in product properties such as viscosity and particle size, due to variations in processing conditions such as pressure and mixing time over the course of a batch run. Still further, large batch runs will typically necessitate the use large processing vessels. Large processing vessels can in turn prove undesirably time consuming to properly clean between runs for or with different product compositions. In addition, in such batch processing it can be difficult to maintain high pressure seals such as typically required to contain supercritical process fluids.

Further, U.S. Pat. No. 5,399,597 emphasizes that with the process disclosed therein, solubilization of components in the supercritical fluid is undesirable as such solubilization would unavoidably result in lose of material upon transfer from the process vessel to the product receiving vessel. The patent teaches the avoidance of such undesirable results through the selection of materials which are not soluble in the supercritical fluid at the operating conditions.

SUMMARY OF THE INVENTION

A general object of the invention is to provide improved processing of powder coatings.

A more specific objective of the invention is to overcome one or more of the problems described above.

The general object of the invention can be attained, at least in part, through the production of a powder coating by a method wherein a stream of a powder coating precursor is contacted with a process media fluid effective to reduce the viscosity of the powder coating precursor stream to allow processing of the powder coating precursor stream at a lower temperature. The powder coating precursor stream includes powder coating ingredients including at least one resin and at least one additional powder coating ingredient. The process media fluid includes a process media material in the form of a fluid selected from the group consisting of supercritical fluids, gases, and liquified gases.

In one particular embodiment, the process media fluid is effective to plasticize at least one of the resin and additional powder coating ingredient.

In another particular embodiment, the process media fluid is a supercritical fluid effective to wholly or partially dissolve at least one of the resin and additional powder coating ingredient.

In yet another particular embodiment, the process media fluid is a gas effective to dilute the mixture of powder coating ingredients, thereby reducing the viscosity of the mixture in the extruder.

The prior art fails to provide systems, apparatus combinations and methods for continuous process production of powder coatings, particularly the production of powder coatings having greater uniformity in one or more properties or characteristic such as particle size, shape, color, gloss and cure rate.

The invention further comprehends a method for producing a powder coating wherein powder coating raw materials are fed to and processed in a continuous extruder. The powder coating raw materials fed to and processed in the continuous extruder include at least one resin and at least one additional powder coating ingredient, with the extruder processing being effective to disperse the at least one additional ingredient with the at least one resin to form an extrudate product. The method of the invention includes the step of adding a process media fluid comprising a process media material in the form of a fluid selected from the group consisting of supercritical fluids, gases, and liquified gases to a process stream of at least one of the following:

a.) raw materials fed to the continuous extruder;

b.) raw materials processed in the continuous extruder; and c.) the extrudate product of the continuous extruder, the addition of the process media fluid being effective to reduce the viscosity of the selected process stream to allow processing of the process stream at a lower temperature.

The invention still further comprehends a method for producing a powder coating wherein a premixed blend of powder coating raw materials are extruded to form an extrudate product. In one embodiment, the premixed blend of powder coating raw materials includes at least one thermosettable resin and at least one curing agent for the at least one thermosettable resin. A stream of the extrudate product is then fed through a melt pump to form a stream of extrudate product at increased pressure. The stream of extrudate product at increased pressure is then spray dried to form the powder coating.

In accordance with this method, at least one of the blend of powder coating raw materials undergoing extrusion and the stream of extrudate product at increased pressure is contacted with a process media fluid selected from the group consisting of supercritical fluids, gases, and liquified gases. The process media is effective to reduce the viscosity of the materials of the selected process stream to allow processing at a lower temperature.

The invention also comprehends systems for producing a powder coating. In accordance with one embodiment, the powder coating producing system of the invention includes a continuous extruder wherein powder coating raw materials including at least one resin and at least one additional powder coating ingredient are fed and processed to disperse the at least one additional ingredient with the at least one resin to form an extruded coating precursor stream.

The system also includes a source of a process media material. The process media material achieves a fluid condition within the processing system and is effective to reduce the viscosity of the powder coating precursor stream to allow processing of the powder coating precursor stream at a lower temperature.

The system further includes means for adding such process media material to at least one of the following:

a.) raw materials fed to the continuous extruder;

b.) raw materials processed in the continuous extruder;

c.) the extruded product of the continuous extruder, and means for forming and separating the coating powder from the process media material.

In particular embodiments, such means for forming and separating the powder coating from the process media material can take various forms including: spray drying (including spray drying into a reclamation booth), formation of a foam or friable mass suitable for subsequent grinding or the like reduction into a desired powder form, and spraying into a solution.

The invention also comprehends a system for producing a coating powder including a continuous extruder, a melt pump, a source of a process media material. In the continuous extruder, powder coating raw materials including at least one thermosettable resin and at least one curing agent for the at least one thermosettable resin are fed and processed to disperse the at least one curing agent with the at least one thermosettable resin to form a molten extruded coating powder precursor. The molten extruded coating powder precursor is processed through the melt pump to form a powder coating precursor stream of increased pressure. The source of a process media material contains a process media material which, within the processing system, is in a fluid condition and effective to reduce the viscosity of the powder coating precursor stream to allow processing of the powder coating precursor stream at a lower temperature.

The system further includes means for adding such process media material to the powder coating raw materials in the continuous extruder and a spray drier to form and separate the powder coating from the process media material.

As used herein, references to a "supercritical fluid" are to be understood to refer to a material that is at a temperature and pressure such that it is at, above, or slightly below its critical point.

As used herein, the "critical point" is the transition point at which the liquid and gaseous states merge into each other and represents the combination of the critical temperature and critical pressure for a given substance.

The "critical temperature," as used herein, is defined as the temperature above which a gas cannot be liquefied by an increase in pressure.

The "critical pressure," as used herein, is defined as that pressure which is just sufficient to cause the appearance of two phases at the critical temperature.

As used herein, references to a "liquified gas" are to be understood to refer to a material which is a liquid but which at standard conditions of temperature and pressure is in the gaseous state.

As used herein, references to a "gas" or "gases" are to be understood to refer to a material which is in the gaseous state at the standard temperature and pressure of 0° C. and 760 mm and under the conditions of temperature and pressure employed in the process of this invention. It is also to be understood that a liquified gas may be admixed with a gas as defined herein.

The terms "powder coating" and "coating powder" are used interchangeably to mean the powder from which a coating is to be made, unless the context requires that "powder coating" means the coating, itself.

The term "generally spherical particles," as used in the context of this invention, encompasses particles having true spherical shapes to those having near spherical shapes. Near spherical shapes include ovoid shaped particles; particles having open or closed bulbous protuberances, such protuberances may or may not be generally spherically shaped; and particles having cellular portions therein. Such cellular portions may extend or be contained internally and/or externally of the major surface of the particle and may be open or closed.

The term "cellular," as used in the context of this invention, means having at least some hollow portion or portions.

Other objects and advantages will be apparent to those skilled in the art from the following detailed description taken in conjunction with the appended claims and drawings.

DETAILED DESCRIPTION OF THE INVENTION

Figure 1:
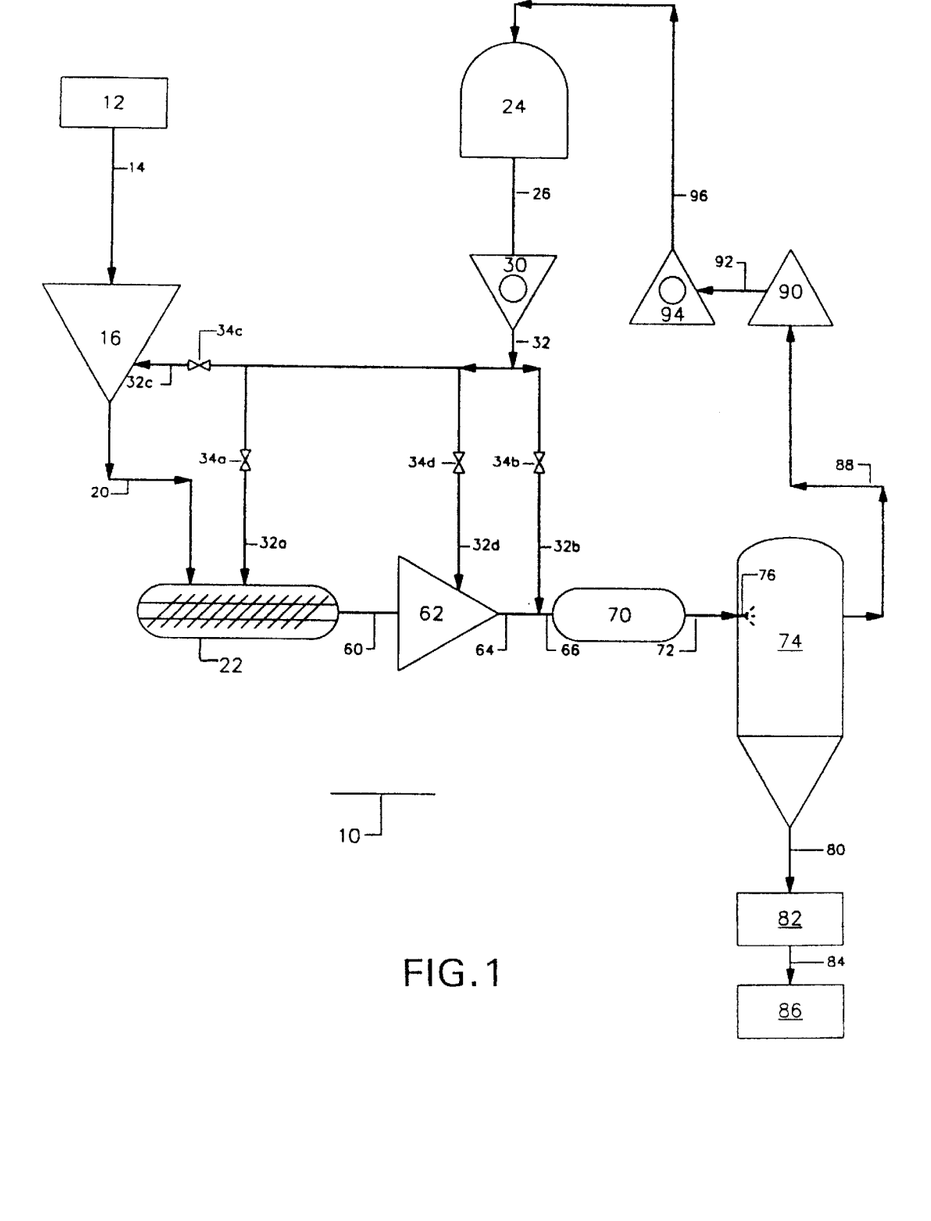
FIG. 1 is a simplified schematic flow diagram of a powder coating processing system in accordance with one embodiment of the invention.

Referring to FIG. 1, there is schematically shown a system, generally designated by the reference numeral 10, for the processing of a powder coating in accordance with the invention. The system 10 includes a source 12 of powder coating raw materials, such as described below, from which a flow stream 14 of raw materials is passed to a raw material feed system 16 to form a flow stream 20 containing a premixed blend of resin-containing powder coating raw materials.

The flow stream 20 is fed to a continuous extruder 22, such as a twin screw extruder, wherein the premixed blend of powder coating raw materials are extruded. In practice, the residence time of the materials within such an extruder is generally less than about 2 minutes and typically in a range of about 30–45 seconds.

The system 10 additionally includes a source 24 of a process media. As described in greater detail below, the process media comprises one or more materials which achieve a fluid condition, i.e., a supercritical fluid, a gas, or a liquified gas, within the processing system. such process media fluid is effective in ireducing the viscosity of powder coating precursor materials or at least selected components of a powder coating precursor composition, especially the powder coating resin. In practice, such viscosity reduction can be realized via dilution of a powder coating precursor composition, or by plasticization, solubilization or partial solubilization of at least particularly selected components of a powder coating precursor composition.

It will be appreciated that such process media materials can be variously added such as by the original addition of the material in such fluid condition, i.e., the material is originally added as a supercritical fluid, as a gas, or as a liquified gas, or by the addition of material in a form which sequentially attains the desired fluid condition. For example, an originally liquified gas can be added with such material subsequently attaining-a supercritical fluid condition in the processing system, such as may be desired.

A flow stream 26 of such a process media is passed through a pressure boosting device 30, such as a pump or a compressor, to form a flow stream 32.

With the opening of the valve 34a, at least a portion of the process media flow stream 32, designated as the flow stream 32a, is passed and added to the materials being processed in the continuous extruder 22. For example, the flow stream 32a of the process media can be directly injected into the barrel portion of such a continuous twin screw extruder. As the materials being processed in the continuous extruder will be undergoing high sheer mixing, the intake of the process media fluid by such materials can be most significant at this position in the processing.

As a result of such process media fluid intake and in comparison to similar processing without such process media intake, lower viscosities are observed, with subsequent lowering of the processing temperature. It will be appreciated that with sufficient lowering of viscosity, the process product can be atomized or, alternatively, isolated as a friable or foam mass which is easily reduced to a powder product. For example, the product out of the extruder may be suitable for immediate further processing such as grinding to form the desired powder product form.

It will also be appreciated that in such processing, the material mass being processed can serve to form the seals required in and for such processing apparatus, thus avoiding the problems associated with prior art high pressure operation, such as identified above.

If necessary or desired and as shown in the embodiment of the invention illustrated in FIG. 1, a flow stream 60 of extruded product, such as in the form of a molten material, is passed to a melt pump 62 through which the extruded powder coating precursor is processed to form a powder coating precursor flow stream 64 of increased pressure to facilitate and permit desired subsequent processing, such as described below. Such a melt pump can, for example, take the form a diaphragm pump, an extruder or, in one preferred embodiment of the invention, a gear pump. In practice, gear pumps are well suited to handle the high torques resulting from use with high viscosity materials such as resins, fillers, etc. such as are commonly present in powder coating compositions.

It will further be appreciated that detrimental viscosity reduction within the extruder can result in either or both poor mixing and flow reversal within the extruder. To avoid such detrimental viscosity reduction, it may be necessary or desirable to limit the amount of process media fluid added to the extruder. However, the addition of further process media fluid may be desired where, for example, the viscosity of the materials being processed has not been sufficiently reduced to easily permit or allow the subsequent atomization of the powder coating precursor material through a spray nozzle or air-assisted nozzle, such as to assist in atomization, or the static mixing or particle size reduction of suspended solids, such as via a MICROFLUIDIZER process apparatus by Microfluidics International Corporation of Newton, MA, for example, as later described herein.

Thus, while in the system described above the process media is disclosed as being added to the materials being processed in the continuous extruder 22, it will be appreciated that such process media can, if desired, be additionally or alternatively added at other locations in the system. For example, alternatively or in addition to the passage and addition of at least a portion of the process media to the materials being processed in the continuous extruder 22, a portion of the process media flow stream 32, designated as the flow stream 32*b*, can with the opening of a valve 34*b*, if desired, be passed and added to the powder coating precursor flow stream 64 of increased pressure to form a powder coating precursor flow stream, designated 66, containing additional process media fluid. In general, the powder coating precursor flow stream 66 is of the form of a fluid solution.

The powder coating precursor flow stream 66 is then passed to one or more continuous fluid mixers 70, such as static in-line mixers, resulting in further mixing of the various components of the powder coating precursor and, desirably, facilitate reduction of the viscosity of the materials streams being processed to form a flow stream 72.

The flow stream 72 is directed to a receiver vessel 74, such as through a spray nozzle or air-assisted nozzle 76, and released to lower, desirably atmospheric pressure. In one embodiment of the invention, the continuous high pressure in the system resulting from the inclusion of the above-described melt pump 64 ensures the flow stream 72 can properly be passed through the nozzle 76.

As a result of such release to such lower, desirably atmospheric pressure, supercritical fluid and liquified gas process media contained in the flow stream will desirably rapidly, preferably immediately, gasify. The gasification of the process media fluid desirably results in the foaming or atomization of the remaining powder coating precursor material.

If desired, an external atomizing force, such as high pressure air, can at this point be injected at the nozzle to facilitate further atomization and formation of particles of the remaining powder coating precursor material.

From the receiver vessel 74, a flow stream 80 of powder coating material is passed to a final processing step 82 wherein, if necessary or desired, the powder coating material can be further ground or screened to produce powder coating particles of the appropriately desired dimensions. In practice, such further grinding and screening will typically only be required or needed when more than about 1 to 2 percent of powder coating material discharged from the receiver vessel 74 exceeds the desired particle size range.

Additionally, postblending of additives such as fumed silicas and aluminum oxide, such as to improve powder flow, eliminate caking of the powder composition or both, or additives to produce desired special effects such as hammertones or metallic coating, for example, can be done, if desired.

A flow stream 84 of finished powder coating particles is passed to a final product collecting vessel 86 for subsequent packaging and handling.

Referring again to the receiver vessel 74, there is formed therefrom a flow stream 88 of volatiles including recovered process media. If desired, this flow stream 88 can be passed to a recovery unit 90, such as a condenser and/or a separator, whereby the process media material is gathered and passed as a flow stream 92 to a pressure boosting device 94, such as a compressor or liquid pump, to form a flow stream 96 for return to the process media source 24.

Thus, the invention provides for simple and effective removal of the process media fluid from the powder coating precursor. As a result, while the presence and use of the process media fluid in accordance with the invention can advantageously facilitate the processing and preparation of powder coatings, such process media fluids will advantageously not detrimentally affect the characteristics and properties of powder coatings so processed.

While in the system as described above the process media fluid has been described as being added to either or both the materials being processed in the continuous extruder 22 and the powder coating precursor resulting from a continuous extruder, it will be appreciated that such process media fluid can, if desired, be additionally or alternatively added at still other points in the system.

For example, with the opening of a valve 34*c*, a portion of the process media flow stream 32, designated as the flow stream 32*c*, can, if desired, be passed and added to the raw materials in the continuous raw material feed system 16. Such addition of the process media fluid with the raw materials being processed can be especially advantageous in conjunction with those temperature sensitive raw materials which permit processing, such as occurs within an extruder, at only relative low processing temperatures.

Thus, in practice, extrusion processing at or below the softening point temperature of the resin can be significant, with processing temperature reductions of at least about 10–20° F. or more, preferably at least about 20–40° F. or more, below the temperature at which the comparable composition without the process media fluid could be processed can be particularly significant and desirable, as described below.

The introduction of the process media fluid with the raw materials can serve to reduce the viscosity of the stream of materials being processed prior to the materials being extruded. As a result of such reduced viscosity, the amount of work input to the materials being processed during such extrusion processing can be substantially reduced, thus reducing the temperatures realized within such an extruder. As a result, raw materials having relatively low cure temperatures can now be practically utilized in powder coating formulations.

Alternatively or in addition, with the opening of a valve 34d, a portion of the process media fluid flow stream 32, designated as the flow stream 32d, can, if desired, be directed at and externally applied to such seals and valves as may be present in the melt pump 62 to assist in keeping such surfaces free of the powder coating materials being processed. It is to be appreciated that such application of the process media fluid can serve to prevent undesired curing of thermosettable resins in areas such as the pump seal area.

Process media useful in the practice of the invention are generally effective in reducing the viscosity of powder coating precursor materials or at least selected components of a powder coating precursor composition, especially the powder coating resin. In practice, such viscosity reduction can be realized via dilution of the powder coating precursor composition, or by plasticization, solubilization or partial solubilization of at least particularly selected components of a powder coating precursor composition.

In particular, in one embodiment of the invention such viscosity reduction as a result of addition of the process media fluid is realized without any significant solubilization of the resin or other coating powder component.

For example, for epoxy and polyester powder coating resins a process media fluid of carbon dioxide as a supercritical fluid can serve to plasticize the resin-containing composition. Also, in such processing, the process media fluid can be added in sufficiently small amounts to achieve desired processing benefits such as resin softening and temperature reduction without significantly dissolving such resin materials. As a result, the amount of process media fluid required can be substantially minimized thereby further improving the economics of such processing. Another example is the dilution of the coating powder precursor with carbon dioxide as the process media fluid in the gaseous state.

The gaseous state is the preferred form of the process media fluid for the practice of this invention because at typical processing temperatures in an extruder, it is difficult to achieve the pressures needed to force many useful gases into the supercritical state or even liquefy them.

In another embodiment, such viscosity reduction as a result of addition of the process media fluid has associated therewith significant solubilization of the resin or other composition component such as to form low viscosity solutions which, for example, can be sprayable such as to form regular spheres.

As described above, the process media of the invention can comprise one or more materials which are in or may achieve a fluid condition, i.e., a supercritical fluid, gases, or a liquified gas, within the processing system. In some particular embodiments of the invention, at least one or more of such process media materials attains a supercritical fluid state within the processing system. In some particular embodiments of the invention, at least one or more of such process media materials attains a liquified gas fluid state within the processing system. While in some embodiments at least one or more of such process media materials attains a supercritical fluid state within the processing system and at least one or more of such process media materials attains a liquified gas fluid state within the processing system.

Examples of compounds which can be used as such process media fluids are given in Table I. Additionally, fluids such as air (moist or dry), nitrogen, hydrogen, helium and argon are especially useful in the gaseous state as process media fluids. Other fluids will occur to those skilled in the art. Mixtures of two or more of the foregoing process media fluids are especially useful at times.

TABLE 1

EXAMPLES OF PROCESS MEDIA FLUIDS

| Compound | Boiling Point (°C.) | Critical Temperature (°C.) | Critical Pressure (atm) | Critical Density (g/cm³) |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Benzene | 80.1 | 288.9 | 48.3 | 0.302 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | 31.2 | 28.0 | 38.7 | 0.579 |
| Monofluoromethane | 78.4 | 44.6 | 58.0 | 0.3 |
| Toluene | 110.6 | 320.0 | 40.6 | 0.292 |
| Pyridine | 115.5 | 347.0 | 55.6 | 0.312 |
| Cyclohexane | 80.74 | 280.0 | 40.2 | 0.273 |
| m-Cresol | 202.2 | 433.0 | 45.0 | 0.346 |
| Decalin | 195.65 | 391.0 | 25.8 | 0.254 |
| Cyclohexanol | 155.65 | 356.0 | 38.0 | 0.273 |
| o-Xylene | 144.4 | 357.0 | 35.0 | 0.284 |
| Tetralin | 207.57 | 446.0 | 34.7 | 0.309 |
| Aniline | 184.13 | 426.0 | 52.4 | 0.34 |
| 1,1,1,2 Tetrafluoroethane | −26.1 | 101.1 | 40.1 | 0.515 |

In addition, near supercritical liquids demonstrate solubility characteristics and other properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some compounds. These variations are considered to be within the concept of a supercritical fluid as used in the context of this invention.

Viscosity reduction achieved through the addition of the process media fluid in accordance with the invention can have significant beneficial processing advantages. For example, in one embodiment, the addition of the process media fluid is effective to form a powder coating precursor material which can be sprayed through a nozzle to provide a powder coating material which requires no additional grinding or screening processing.

In another embodiment, the addition of the process media fluid is effective to reduce the processing temperature of the materials being processed. For example, the addition of the process media fluid can be effective to reduce the processing temperature in the system continuous twin screw extruder. Thus, through the addition of a process media fluid in accordance with the invention, the extrusion temperature of epoxy resin-based powder coating precursor can be reduced from about 180° F. or more to about 100° F., for example. As a result of the utilization of such lower processing temperatures, the range of compositions is increased as materials unsuitable for use at such prior higher processing temperatures can now be utilized.

In practice, such addition of the process media fluid permits the processing temperature to be reduced below, preferably about 10–20° F. below, and in some cases more preferably at least about 20–40° F. below, the softening temperature of the particular resin of the powder coating composition under preparation.

In addition to being effective in reducing the viscosity of powder coating precursor materials or at least selected components of a powder coating precursor composition, especially the powder coating resin, the process media fluid contacted with the coating precursor will preferably be of a composition or form which facilitates subsequent removal of the process media material prior to formation of the final coating powder particles. For example, supercritical fluid process media will typically flash to a vapor when exposed to reduced or atmospheric pressure. Compressed gases, of course, escape especially readily.

It is to be appreciated and understood that the means for forming and separating the powder coating from the process media material can take various forms dependent on the specific processing needs. Thus, means for forming and separating the powder coating from the process media material in accordance with the invention can include: spray drying (including spray drying into a reclamation booth), formation of a foam or friable mass suitable for subsequent grinding of the like reduction into a desired powder form, and spraying into a solution.

In connection therewith, although the addition of a process media material in accordance with this invention can serve to reduce the viscosity of the material being processed, the viscosity of at least certain materials so processed may remain sufficiently high that the processing of such materials through a spray nozzle may remain difficult.

Figure 3:
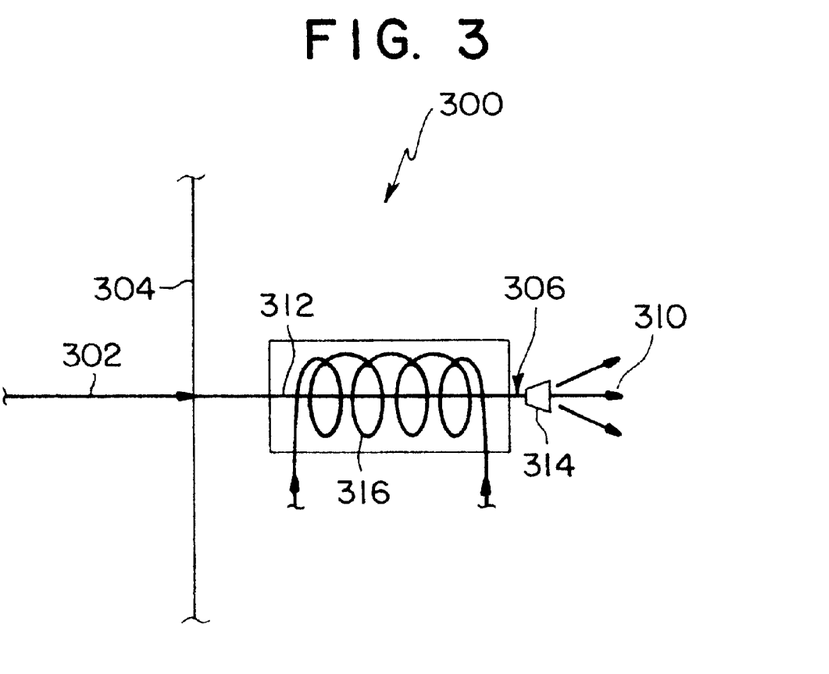
FIG. 3 is a schematic of a processing subsystem for the formation and separation of a powder coating from a process stream in accordance with one embodiment of the invention.

Turning to FIG. 3, there is schematically illustrated a processing subsystem 300 for the formation and separation of a powder coating from a process stream in accordance with one embodiment of the invention. More specifically and as shown, a process stream 302, such as the above-described flow stream 72, is passed through a container wall 304 and out via a heated nozzle 306 to form a spray 310 of powder coating particles. It will be appreciated that the nozzle 306, which includes the process material flow conduit 312 adjacent the nozzle outlet 314, can be of various forms including, for example, a nozzle heated by means of a hot oil or electric coil 316, for example. Such heating of the nozzle can serve to increase the solubility of the process media in the material being processed, thus further reducing the viscosity of the material being processed sufficiently to allow atomization of of the process material and the obtaining of spherical particles upon spraying of the material being processed. In such a processing subsystem, heat is generally applied at the point of atomization or formation of the powder coating particles.

While alternative methods of increased or further viscosity reduction, such as through the addition of a co-solvent, are discussed below, it will be appreciated that such addtion of a co-solvent can be undesirable because of the increased costs associated therewith, e.g., the cost of the co-solvent itself and the need or desire to recycle and process such a co-solvent. Thus, it will be appreciated that such a processing system wherein heat is generally applied at the point of atomization or formation of the powder coating particles can offer or provide certain processing advantages.

Figure 4:
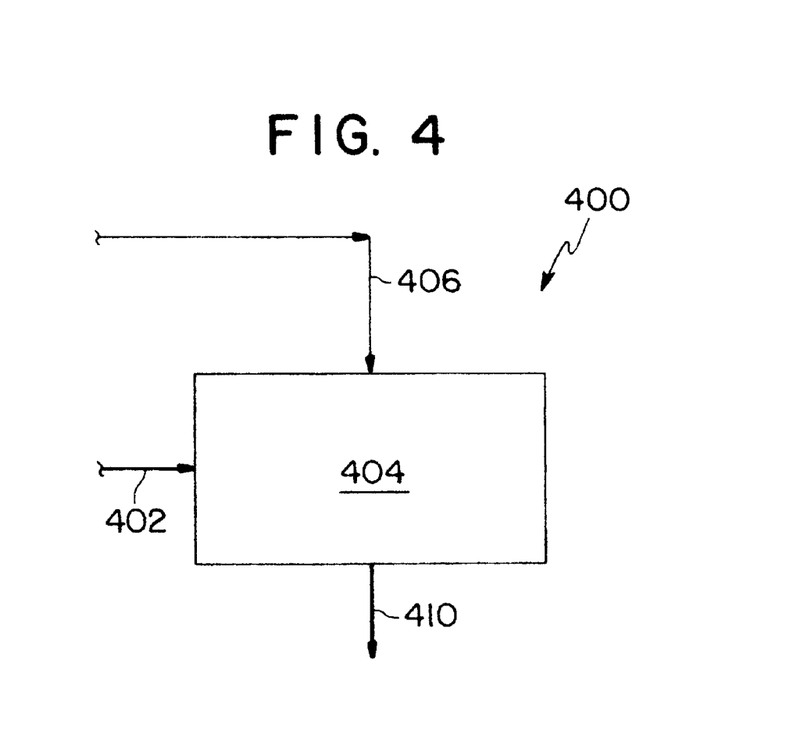
FIG. 4 is a schematic of a processing subsystem for the formation and separation of a powder coating from a process stream in accordance with an alternative embodiment of the invention.

Reference is now made to FIG. 4 which schematically illustrates a processing subsystem 400 for the formation and separation of a powder coating from a process stream in accordance with an alternative embodiment of the invention. More specifically and as shown, a process stream 402, such as, for example, the above-described extruded product flow stream 60, powder coating precursor flow stream 64 or flow stream 72, is passed to a mill, grinder or the like 404. If necessary or desired, a flow stream 406 of a cryogen such as liquid nitrogen is added to the mill 404 and a flow stream 410 of powder coating material is passed from the mill 404.

It will be appreciated that such addition of a cryogen may be desired or required in order to permit or facilitate the ready grinding of materials such as thermoplastic resin-based powder coating compositions, as commonly associated with commercial grinding of such materials.

The grinding of powder coating process streams, in accordance with the invention, is described in greater detail in connection with Examples, below.

In addition, the process media used in the practice of the invention preferably are relatively inexpensive, recyclable, nontoxic and non-reactive with powder coating composition ingredients.

Carbon dioxide as either a liquified gas or a supercritical fluid is a preferred process media fluid for use in the practice of the invention. The solvency of supercritical carbon dioxide is similar to that of a lower hydrocarbon (e.g., butane, pentane, or hexane) and, as a result, one can consider supercritical carbon dioxide as a replacement for the hydrocarbon diluent portion of a conventional solvent borne coating formulation.

In practice, such a process media are added ranging from about 0.1 to about 99 or more parts of process media to base resin. For example, gaseous, supercritical or liquid $CO_2$ is typically added in relative amounts of about 10 to about 90% by weight of the resin.

It is further to be appreciated that it may sometimes be desirable to employ one or more co-solvents in addition to the process media. For example, the inclusion of a co-solvent may be desired where the addition of the process media, such a liquified or supercritical $CO_2$, does not by itself reduce the viscosity of the powder coating precursor materials or at least selected components of a powder coating precursor composition, especially the powder coating resin to the extent desired or required for the desired further processing. The addition of a co-solvent may also be desired in order to more fully or completely dissolve selected components of the coating powder mixture.

Co-solvent(s) suitable for the practice of this invention generally include any solvent or mixture of solvents which is miscible with the process media fluid and is a good solvent for a powder component. Additionally, desired co-solvents are generally significantly unreactive with the powder coating composition materials and are relatively easily removed, such as by drying or extraction processing, from the powder coating precursor.

Solubility parameters may be taken into account in the choice of the solvent. It is recognized that some organic solvents, such as cyclohexanol, have utility as both conventional solvents and as a process media. As used herein, the term "co-solvent" does not include solvents in the supercritical or liquified gas state.

Among suitable co-solvents are organic solvents such as: tetrahydrofuran, ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters, methyl t-butyl ethers, dibutyl ether, methyl phenyl ether and other aliphatic or alkyl aromatic ethers; glycol ethers such ethoxyethanol, butoxyethanol, ethoxypropanol, propoxyethanol, butoxypropanol and other glycol ethers; glycol ether ester such as butoxyethoxy acetate, ethyl ethoxy propionate and other glycol ether esters; alcohols such methanol, ethanol, propanol, 2-propanol, butanol, amyl alcohol and other aliphatic alcohols; aromatic hydrocarbons such as toluene, xylene, and other aromatics or mixtures of aromatic solvents; and nitro alkanes such as 2-nitropropane. Generally, co-solvents suitable for this invention must have the desired solvency characteristics as aforementioned and also the proper balance of evaporation rates so as to insure good powder formation. A review of the structural relationships important to choice of solvent or solvent blend is given by Dileep et al., *Ind. Eng. Chem.* (Product Research and Development) 24, 162, 1985 and Francis, A. W., *J. Phys. Chem.* 58, 1009, 1954.

In practice, such co-solvents are typically added in relative amounts of about zero to about 50% by weight of the total mass of the composition.

As described above, viscosity reduction as a result of addition of the process media fluid has associated therewith in one embodiment of the invention significant solubilization of the resin or other composition component such as to form low viscosity solutions. For example, a process media fluid of supercritical carbon dioxide and a co-solvent such as tetrahydrofuran or methyl ethyl ketone, for example, can be effective to dissolve the powder coating resin or other coating composition resin.

Figure 2:
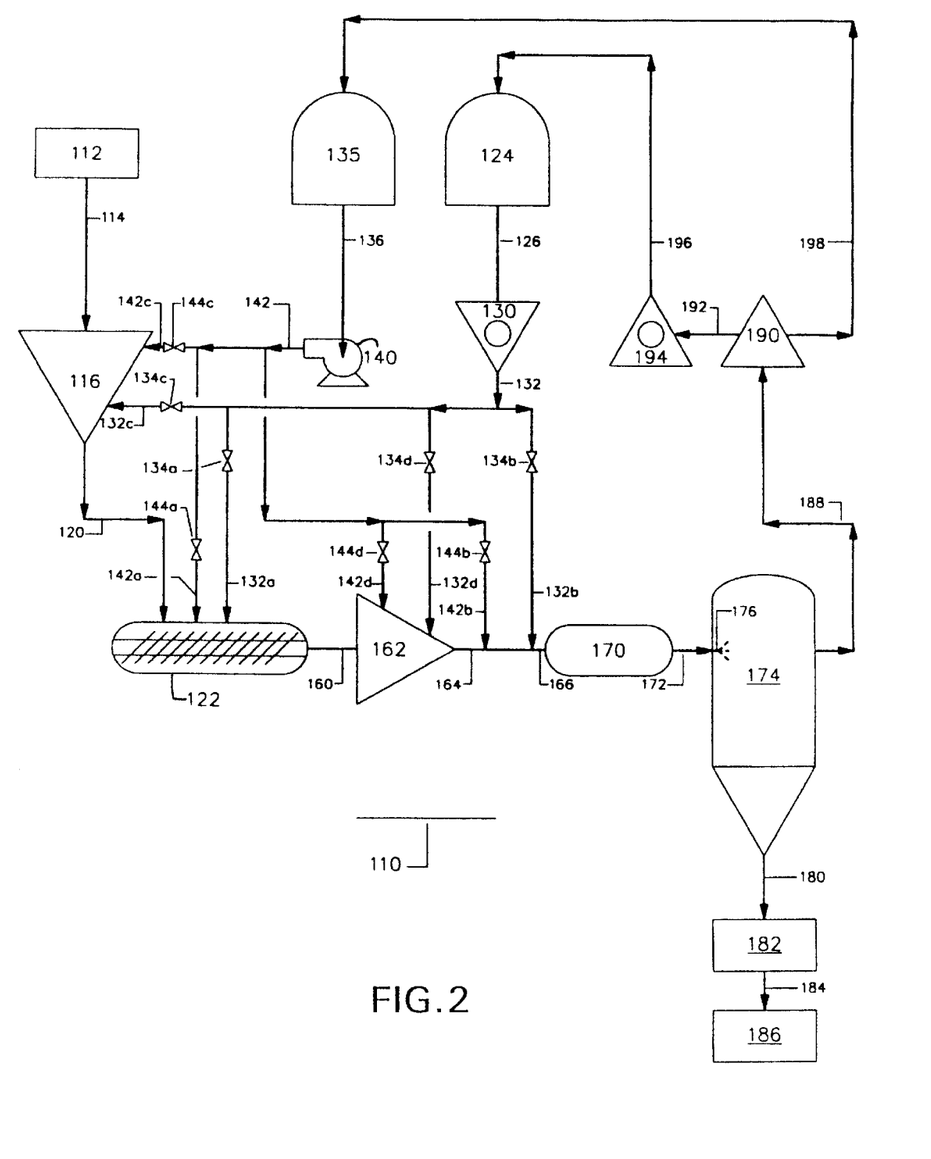
FIG. 2 is a simplified schematic flow diagram of a powder coating processing system in accordance with an alternative embodiment of the invention.

FIG. 2 illustrates schematically a system, generally designated by the reference numeral 110, for the processing of a powder coating in accordance with another embodiment of the invention. As will be described in greater detail below, the system 110 provides for the addition of both a co-solvent and a supercritical fluid process media.

The system 110, similar to the system 10 described above, includes a source 112 of powder coating raw materials from which a flow stream 114 of raw materials is passed to a raw material feed system 116 to form a flow stream 120 containing a premixed blend of powder coating raw materials. The flow stream 120 is fed to a continuous extruder 122 wherein the premixed blend of powder coating raw materials, such as described herein, are extruded.

As with the system 10, described above, the system 110 additionally includes a source, herein designated 124, of a process media. In one particular embodiment of the invention, a flow stream 126 of this process media is passed through a pressure boosting device 130, such as a pump or a compressor, such that the process media achieves a supercritical state, forming a flow stream 132. In particular, such supercritical fluid is effective to plasticize at least selected components of a powder coating precursor composition.

With the opening of a valve 134a, at least a portion of the supercritical fluid process media flow stream 132, designated as the flow stream 132a, is passed and added to the materials being processed in the continuous extruder 122.

The system 110 additionally include a source 135 of at least one co-solvent, such as described herein and desirably in the form of a liquid.

Such addition of co-solvent can be desired where, for example, the added process media fluid is unable to alone provide the desired amount of plasticization to at least selected components of the powder coating precursor composition.

In one particular embodiment of the invention, the process media is a supercritical fluid, such as $CO_2$, and a co-solvent, such as tetrahydrofuran or methyl ethyl ketone, for example, appropriately selected from the above-provided listing of solvent materials is added.

As identified and described in commonly assigned U.S. Pat. No. 5,708,039, issued from application Ser. No. 08/662, 104, filed Jun. 14, 1996, the disclosures of which are fully incorporated herein by reference, such co-solvent addition can result in the formation of cellular, generally spherical coating powder particles such as can be desirable in the formation of thin film coatings.

In one particular embodiment of the invention, a flow stream 136 of the co-solvent is passed through a pressure boosting device 140, such as a pump or a compressor, to form a flow stream 142.

The flow stream 142 or portions thereof can then be appropriately directed so that the co-solvent is added to the desired process streams. For example, with the opening of a valve 144a, at least a portion of the co-solvent flow stream 142, designated as the flow stream 142a, is passed and added to the materials being processed in the continuous extruder 122.

As with the above-described system 10, the extruder forms a stream of extruded product, herein designated as the flow stream 160. The flow stream 160 of the extruded product, such as in the form of a molten material, is passed to a melt pump 162 through which the extruded powder coating precursor is processed to form a powder coating precursor flow stream 164 of increased pressure. As described above, such a melt pump can, for example, take the form a diaphragm pump, an extruder or, in one preferred embodiment of the invention, a gear pump.

With the opening of a valve 134b, a portion of the supercritical fluid process media flow stream 132, designated as the flow stream 132b, is passed and added to the powder coating precursor flow stream 164 of increased pressure.

Additionally, if desired, with the opening of a valve 144b, a portion of the co-solvent flow stream 132, designated as the flow stream 132b, is passed and added to the powder coating precursor flow stream 164 of increased pressure.

Such addition of one or more of the supercritical fluid process media and liquid co-solvent forms a powder coating precursor flow stream, designated 166, containing some or additional liquid co-solvent and/or supercritical fluid process media. As described above, such addition of further of the liquid co-solvent and the supercritical fluid process media can be desired where, for example, the viscosity of the materials being processed has not been sufficiently reduced to easily permit or allow the subsequent atomization of the powder coating precursor material through a nozzle. In general, the powder coating precursor flow stream 166 is of the form of a fluid tko solution.

The powder coating precursor flow stream 166 is then passed to one or more continuous fluid mixers 170, such as static in-line mixers, resulting in further mixing of the various components of the powder coating precursor and, desirably, facilitate reduction of the viscosity of the materials streams being processed to form a flow stream 172.

The flow stream 172 is directed to a receiver vessel 174, such as through a spray or air-assisted nozzle 176, and released to atmospheric pressure. As a result, the process media contained in the flow stream will immediately gasify and cause foaming and atomization of the remaining powder coating precursor material.

If desired, an external atomizing force, such as high pressure air, can at this point be injected into the receiving vessel to facilitate further atomization and formation of particles of the remaining powder coating precursor material.

From the receiver vessel 174, a flow stream 180 of powder coating material is passed to a final processing step 182 wherein, as described above, if necessary or desired, the powder coating material can be further ground or screened to produce powder coating particles of the appropriately desired dimensions.

Further, as also described above, postblending of additives can also be done, if desired.

A flow stream 184 of the finished powder coating particles is passed to a final product collecting vessel 186 for subsequent packaging and handling.

Referring again to the receiver vessel 174, there is formed therefrom a flow stream 188 of volatiles including recovered fluid process media and co-solvent. This flow stream 188 is passed to a recovery unit 190, such as a condenser and/or a separator, whereby the process media material is separated from the co-solvent. The process media is passed as a flow stream 192 to a pressure boosting device 194, such as a compressor or liquid pump, to form a flow stream 196 for return to the process media source 124. The co-solvent in turn is passed as a flow stream 198 to the process media source 135.

While in the system as described above, the process media fluid and co-solvent have been described as being added to either or both the materials being processed in the continuous extruder 122 and the powder coating precursor resulting from a continuous extruder, it will be appreciated that such process media fluid and co-solvent can, if desired, be additionally or alternatively added at still other points in the system.

For example, with the opening of a valve 134*c*, a portion of the process media flow stream 132, designated as the flow stream 132*c*, can, if desired, be passed and added to the raw materials in the continuous raw material feed system 116.

Similarly, with the opening of a valve 144*c*, a portion of the co-solvent flow stream 142, designated as the flow stream 142*c*, can, if desired, be passed and added to the raw materials in the continuous raw material feed system 116.

Alternatively or in addition, with the opening of a valve 134*d*, a portion of the process media fluid flow stream 132, designated as the flow stream 132*d*, can, as described above, be directed at and externally applied to such seals and valves as may be present in the melt pump 162.

Similarly, with the opening of a valve 144*d*, a portion of the co-solvent flow stream 142, designated as the flow stream 142*d*, can, if desired, be directed at and externally applied to such seals and valves as may be present in the melt pump 162 such as to assist in keeping such surfaces free of the powder coating materials being processed.

Examples of powder coating raw materials suitable for use in the present invention include thermoplastic and thermoset base resins.

Thermoplastic resins suitable for use in the coating powders of this invention must melt and flow out to a thin film within a few minutes at application temperatures of from 200° C. to 300° C. without significant degradation. Examples of suitable thermoplastic resins for use in the practice of the invention include polyamides, polyesters, cellulose esters, polyethylene, polypropylene, poly (vinyl chloride) or PVC, poly (vinylidene fluoride) or $PVF_2$, polyphenylsulfones and poly (tetrafluoroethylene) or PTFE. It is to be appreciated that as a result of the typically lower processing temperatures to which resins are subjected to in the practice of the invention, thermoplastic resins such as polyphenylsulfones and PTFE are particularly suited for processing in accordance with the invention.

Plasticization of PVC has been the conventional way to lower its melt viscosity so that it will flow sufficiently when heated to form a continuous film. Nylon-11 and nylon-12 resins are representative of the polyamides and cellulose acetate butyrate is an example of the cellulose esters contemplated for use in this invention. All of the suitable thermoplastic resins are available commercially from numerous sources.

The thermosettable resins which are suitable for this invention include epoxy resins, polyurethanes, silicones, polyesters (including unsaturated polyesters), acrylics, and hybrids such as epoxy-acrylic, polyester-acrylic, and epoxy-polyester. The glass transition temperature ($T_g$) of these resins must be high enough that the particles do not fuse together or sinter at temperatures likely to be encountered during transportation and storage. Preferably, the $T_g$ is at least about 50° C.

The epoxy resins are those containing aliphatic or aromatic backbones with oxirane functionality and are exemplified by the diglycidyl ether condensation polymers resulting from the reaction of epichlorohydrin with a bisphenol in the presence of an alkaline catalyst. Bisphenol A is most commonly used but the bisphenols B, F, G and H are also suitable. By controlling the operating conditions and varying the ratio of the reactants, products of various equivalent weights can be made. For the purposes of this invention, the epoxide equivalent weight (EEW) may be from about 600 to about 2000 and the hydroxyl equivalent weight may be from about 300 to about 400. These are available from a wide variety of commercial sources. The GT-series of bisphenol A epoxies from Ciba-Geigy, including 7004, 7013, 7014, 7074, and 7097 are examples of useful epoxy resins in this invention. Shell Chemical Co. also supplies suitable epoxy resins under its EPON trademark.

Dicyandiamide, modified and substituted dicyandiamides, solid dicarboxylic acids and their anhydrides are examples of the many agents that may be used for the curing of epoxy resins. A curing agent in solid form is preferred for convenience in the formulation of epoxy resin-based powders as well as in the formulation of other resin-based powders in this invention.

Hydroxy functional polyesters are predominantly hydroxyl in functionality; their acid number is preferably about 15 or less and, even more preferably, from about 1 to 2. The hydroxyl number, on the other hand, is preferably from about 25 to about 50, as conventionally reported. The $T_g$ is preferably higher than 50° C. because of its effect on the blocking problem. They are the condensation products of polybasic carboxylic acids and polyhydric alcohols.

Examples of carboxylic acids useful for the preparation of such polyester resins are phthalic acid, tetra-and hexahydrophthalic acids and their anhydrides, adipic acid, sebacic acid, terephthalic and isophthalic acids, 1,3- and 1,4-cyclohexanedicarboxylic acids, and trimellitic anhydride, esters of such acids and mixtures of two or more. Ethylene-,diethylene-, propylene-, and trimethylene glycol exemplify the bifunctional alcohols, along with other dihydric alcohols such as hexanediol, 1,3-, 1,2-, and 1,4-butanediols, neopentyl glycol, 2-butyl-2-ethyl-1,3-propanediol, 2-methyl-1,3-propanediol, 1,4-cyclohexanediol, trimethylolpropane, and mixtures of two or more. Condensation of the acids and alcohols is a well-known reaction and various processes for carrying it out are also well known. The temperature is suitably from about 180° C. to about 300° C.; an azeotropic distillation with a solvent or a stream of an inert gas through a molten mixture of the reactants may be used to enhance the removal of water formed by the condensation; and a catalyst such as p-toluenesulfonic acid or dibutyltin oxide may be used. An ester interchange reaction catalyzed by a lead carboxylate or oxide, zinc acetate, lithium hydroxide or carboxylate may be used at temperatures of 200° C. to 300° C. Hydroxy functional polyesters are commercially available under the trademarks RUCOTE 107, CARGILL 3000, CARGILL 3016, and CRYLCOAT 3109.

The hydroxyl-functional polyesters are curable through the hydroxyl groups with aminoplasts and with aliphatic and aromatic isocyanates. Isocyanate curing forms resins which technically are polyurethanes but are often sold as polyesters. The aminoplasts are oligomers that are the reaction products of aldehydes, particularly formaldehyde, with amino- or amino-group-carrying substances exemplified by melamine, urea, dicyandiamide, and benzoguanamine. It is preferable in many instances to employ precursors of aminoplasts such as hexamethylol melamine, dimethylol urea, and their etherified forms, i.e., modified with alkanols having from one to four carbon atoms. Hexamethoxymethyl melamine and tetramethoxy glycoluril exemplify said etherified forms. Thus, a wide variety of commercially available aminoplasts and their precursors can be used for combining with the linear polyesters of this invention. Particularly preferred are the amino cross-linking agents sold by American Cyanamid under the trademark CYMEL. In particular, the CYMEL 301, CYMEL 303, and CYMEL 385 alkylated melamine-formaldehyde resins are useful. Of course, it is possible to use mixtures of all of the above N-methylol products.

Aminoplast curing agents are generally provided in an amount sufficient to react with at least one-half the hydroxyl groups of the polyester, i.e., be present at least one-half the stoichiometric equivalent of the hydroxyl functionality. Preferably, the cross-linking agent is sufficient to substantially completely react with all of the hydroxyl functionality of the polyester, and cross-linking agents having nitrogen cross-linking functionality are provided in amounts of atfrom about 2 to about 12 equivalents of nitrogen cross-linking functionality per equivalent of hydroxyl functionality of the polyester. This typically translates to an aminoplast being provided at between about 10 and about 70 phr.

The curing of hydroxyl-functional polyesters with an aminoplast takes place in about 20–30 minutes at temperatures within the range of from about 120–200° C. (about 250–400° F.).

Acidic catalysts may be used to modify the curing of the polyester with an aminoplast resin by lowering the required temperature or raising the reaction rate or both. When it is desirable to lower the rate at ambient storage temperatures, the acidic catalyst may be blocked with an amine. Volatile amines which may escape from the curing film when the catalyst is unblocked by heat are suitable for this purpose. It is particularly desirable for the purposes of this invention to delay full curing of the composition until the coated metal substrate has traveled about three-fourths of the length of the curing oven. In a particular embodiment, the dwell time before full curing was about 33 seconds. An amine-blocked dinonylnaphthalenesulfonic acid sold by King Industries under the trademark and number NACURE 1557 is an example of the blocked acid catalyst contemplated for use in the aminoplast curing of the powder coating composition of this invention. The curing may also be retarded by the addition of free amines such as triethanolamine.

The diisocyanates cure the hydroxy-functional polyester resin by forming urethane linkages between the polymer chains at the hydroxyl group sites. Aliphatic diisocyanates are exemplified by hexamethylene diisocyanate (HDI), diisocyanato di-cyclohexylmethane (sold under the trademark DESMODUR W by Miles Chemical), and isophorone diisocyanate (IPDI). Toluene diisocyanate (TDI) is an example of a suitable aromatic diisocyanate. The low-temperature reactivity of free diisocyanates may be lessened by adducting them with blocking agents selected from phenol, cresols, isononylphenol, amides such as ε-caprolactam, oximes such as methyl-ethyl ketoxime and butanoneoxime, active methylene group-containing compounds such as diethylmalonate and isopropylidene malonate and the acetoacetates, and sodium bisulfite. The adducts have a weak bond which breaks at an elevated temperature to regenerate the blocking agent and the free diisocyanate which can react with the polyester in the desired manner. Examples of the blocked diisocyanates include caprolactam blocked isophorone diisocyanate and caprolactam blocked hexamethylene diisocyanate. Examples of commercially available curing agents of this type are the 24-2400, 24-2430, and 24-2450 products sold under the CARGILL trademark.

An excess of from about 10 to 20%, preferably 5 to 10%, by weight of the diisocyanate may be used beyond the stoichiometric amount. The reaction of the polyester with the diisocyanate is performed in the absence of moisture at a temperature of from about 80° C. to about 230° C. and, when a blocked diisocyanate is used, the temperature is preferably at least about 120° C. and is more preferably about 200° C. or higher. Dibutyltin dilaurate and triethylene diamine are examples of the catalysts that may be used to promote the diisocyanate cure. The use of blocked isocyanates in the curing of coatings is described in a paper presented by T. A. Potter, J. W. Rosthauser, and H. G. Schmelzer at the Water-Borne & Higher-Solids Coatings Symposium at New Orleans on Feb. 5–7; 1986; the paper is incorporated herein by reference.

Carboxyl-functional polyesters are also suitable for the purposes of this invention. They may be made from the same polyfunctional acids and glycols as are the hydroxyl-functional polyesters but with an excess of the acids. The acid number is from about 18 to about 55. They are exemplified by products sold under the trademarks CRYL-COAT 430, CRYLCOAT 3010, URALAC 3400, URALAC 3900, and GRILESTA V7372, which has a T of 60° C. and an acid number of 32–35, and which is sold by Ems-Chemie AG. Fast cures are achieved with polyepoxide curing agents such as itriglycidyl isocyanurate (TGIC).

Unsaturated polyesters suitable for use in the practice of the invention include ethylenically unsaturated reaction products of an organic di or polyfunctional acid and a di or polyfunctional alcohol. Typically the acid is unsaturated. Such polyester resins typically work best in combination with a copolymerizable second resin such as diallyl phthalate. Initiators may also need to be incorporated.

A hybrid resin system is typically considered a mixture of a carboxyl-functional polyester and an epoxy resin. The acidic polyester suitably has an equivalent weight of 550–1100 and the epoxy resin has an equivalent weight of 600–1000. Zinc oxide is effective as a catalyst at 1–5 parts per hundred parts by weight of the resins to improve the cure rate and physical properties of the product. Other hybrid resin systems such as the epoxy-acrylic and polyester-acrylic mixtures mentioned above are also suitable for this invention.

The preferred acrylic resins for coating powders are copolymers of alkyl acrylates and/or methacrylates with glycidyl-methacrylates and/or acrylates and olefinic monomers such as styrene. Glycidyl-functional acrylic resins are sold by Mitsui Toatsu Chemicals, Inc. under the trademark ALMATEX (e.g., PD-7610, PD-7690, PD-6100). The ALMATEX PD-7610 resin, for example, has an epoxy equivalent of 510–560 and a melt index of 50–58. Solid dicarboxylic acids having, for example, 10 or 12 carbon atoms are used to cure the glycidyl-functional acrylic resins. A carboxy-terminated polymer may also be used as a cross-linking agent for such acrylic resins. Hydroxyalkyl acrylate and methacrylate copolymers are also suitable for this invention.

Suitable silicone resins for use in this invention should be solid at room temperature and preferably have a $T_g$ of at least about 45° C. The organic moieties of the silicone resins are aryl, particularly phenyl, or short chain ($C_1$–$C_4$) alkyl. For good heat resistance, methyl and phenyl groups are the organic moieties of choice. Generally, the more phenyl groups, the higher heat-resistance provided. Examples of such silicone resins are phenylsilicone SY-430, sold by Wacker Silicone, Conshohocken, Pa., having an average molecular weight of about 1700, methylsilicone MK also sold by Wacker and methylphenylsilicone 6-2230 sold by Dow Corning.

For high temperature stability, silicone resins useful in the invention have a degree of substitution as described in *Silicones in Protective Coatings*, supra of about 1.5 or less, typically between about 1 and about 1.5. Specifically, degree of substitution is defined as the average number of substituent groups per silicon atom and is the summation of the mole per cent multiplied by the number of substituents for each ingredient. Silicon resins are used which self-condense at high end-use temperatures, e.g., that of a barbecue grill or an automobile exhaust part. This requires siloxane functionality (Si—O—H), and silicone resins used herein have an —OH content of between about 2.5 and about 7.5 wt % of the silicone resin. Suitable silicone resins for use in the invention are discussed in "Silicones in Protective Coatings" by Lawrence H. Brown in *Treatise on Coatings* Vol. 1, Part III "Film-Forming Compositions," pp. 513–563, R. R. Meyers and J. S. Long eds. Marcel Dekker, Inc. New York, 1972, the teachings of which are incorporated herein by reference. Suitable silicone resins are also described in U.S. Pat. Nos. 3,170,890 and 4,879,344 3,585,065 and 4,107,148, the teachings of which are incorporated herein by reference.

Further, crystalline resins, such as the crystalline polyester PIONEER PIOESTER 4350–55, can also be used.

Additives suitable for inclusion in the coating powder compositions include antioxidants, light stabilizers, pigments and dyes, processing aids, antiblocking agents, and the anti-cratering agents.

Examples of antioxidants include, but are not limited to: hindered phenols, phosphites, and propionates. Examples of hindered phenols are 1,3,5-trimethyl-2,4,6-tris-(3,5-di-tert-butyl-4-hydroxybenzyl)benzene; octadecyl-3-(3,5-ditert-butyl-4-hydroxyphenyl)propionate; tetrakis [methylene-3 (3',5'-di-tert-butyl-4'-hydroxyphenyl)-propionate]methane); 4,4'-butylidene-bis(5-methyl-2-t-butyl)phenyl; and 2,2'-ethylidene-bis-(4,6-di-tert-butylphenol). Examples of phosphite antioxidants are tris(2,4-di-tert-butyl-phenyl) phosphite; bis(2,4-di-t-butyl-phenyl) pentaerythritol diphosphite; and 2,2'-ethylidene-bis(4,6-di-t-butylphenyl) fluorophosphite. Examples of propionate antioxidants are dilauryl thiodipropionate and distearyl thiodipropionate. IRGANOX 1010 hundred phenol and IRGAFOS 168 phosphite are commercially available antioxidants. Antioxidants may be used in amounts ranging from about 0.01 to about 2.0 percent by weight of the powder.

Light stabilizers and UV absorbers are exemplified by benzophenone stabilizers, such as those sold under the trademarks CYASORB-UV 2018 (American Cyanamid), hindered amine compounds, including those marketed by Ciba-Geigy under the trademarks TINUVIN 144, TINUVIN 292, TINUVIN 944, TINUVIN 622LD, and TINUVIN 770 (N,N-diphenyl-N,N-di-2-naphthyl-p-phenylene-diamine), and BASF's UVINUL M40 and UVINUL 490, particularly those containing tetra alkyl-piperidinyl functionality, and UV absorbers marketed by Ciba-Geigy under the trademark TINUVIN 900 and by American Cyanamid under CYANOX 3346.

Examples of antiblocking agents (dry flow agents) are fumed silica, clay, talc, fumed alumina, and precipitated silica. Commercial examples of antiblocking agents are sold under the trademarks AEROSIL and CABOSIL. Flow levelling (anti-cratering) agents are sold under the trademarks TROY EX-486 and RESIFLOW P-67 (a low molecular weight acrylic resin). Other additives often used to de-gas the films are sold under the trademarks URAFLOW B (benzoin), OXYMELT A-1 and OXYMELT A-2.

The deleterious effects of surfactants and other additives such as chain stoppers in the final coating film can be avoided by not including such additives in the powder coating compositions processed in accordance with the invention. It is to be understood, however, that at least in certain specific embodiments, it may be desirable to use a surfactant that enhances the solubility of the selected resin in the selected process fluid media. For example, fluorocarbons, fluoroethers, and siloxanes can serve as useful surfactants in combination with a process media fluid of carbon dioxide.

It is to be appreciated that the systems of the invention, such as the above-described continuous processing systems, can be relatively easily purged to clean between processing runs for or with different product compositions. Thus, such systems can have more desirable commercial utility and application.

It is also to be appreciated that an advantage of to the continuous processing of powder coating materials in accordance with the invention is the facilitation of the attainment of steady state processing conditions such as temperature, pressure and time at conditions.

A wide variety of powder coating materials can be prepared in accordance with the invention, including:
   a.) the powder coating materials identified and described in the previously referred to U.S. Pat. No. 5,708,039, including the cellular, generally spherical coating powder particles and such as produced by the dissolution of the ingredients of a coating powder in a supercritical fluid with a co-solvent, as disclosed therein. Such powder coating materials are disclosed therein as having an extremely narrow particle size distribution. Specifically, with the exception of a minor amount of fines having particle diameter of less than 2 microns, the particle sizes of such powder materials are all within the range of from about 2 to about 40 microns, with about 96% of the volume of the powder having a particle size of 20 microns or less and about 75% of its volume having a particle size between 2 and 20 microns. Thus, such powder coating particles range in size from less than 2 to about 40 microns with a mean particle size of about 4.4 microns and a median size of from about 6 to about 7 microns, wherein particle size measurement are made with a COULTER LS Particle Size Analyzer wherein a Fraunhofer optical model (PIDS included) and an LS 130 fluid module is used;

b.) the powder coating materials identified and described in U.S. Pat. No. 5,399,597, issued Mar. 21, 1995, the disclosure of which is fully incorporated herein by reference, including the flake-type and rounded particles disclosed therein such as produced by a method of:

providing a first vessel connected by piping to a second vessel;

charging such first vessel with starting materials;

supplying $CO_2$ to such first vessel and holding such $CO_2$ in such first vessel at such a temperature and pressure that such $CO_2$ comprises a supercritical fluid;

agitating such starting materials and such supercritical fluid;

transferring such $CO_2$ and such starting materials through a spray nozzle having an orifice diameter of from about 0.001" to about 1"; and then discharging such $CO_2$ and such starting materials into a second vessel being maintained at a lower pressure than the first vessel;

c.) the powder coating materials identified and described in U.S. Pat. No. 4,582,731, issued Apr. 15, 1986 and U.S. Pat. No. 4,734,227, issued Mar. 29, 1988, the disclosures of which are fully incorporated herein by reference, including particles in a narrow size distribution, having average sizes ranging from 0.3 micron to about 3 microns;

d.) powder coating materials which include crystalline resins such as PIONEER PIOESTER 4350–55 and a curing agent; and e.) highly reactive powder coating system, such as primary amine cured epoxies, suitable for application on temperature sensitive substrates such as plastics, wood, and pre-assembled articles that contain or include heat sensitive components.

In general, the powder coatings prepared in accordance with the invention are suitable for application to a wide variety of substrate materials including metallic and non-metallic substrates. For example, such powder coatings can be applied to various metallic substrates which are inert to the coating material. Such metallic substrates can typically include various structural metals such as iron, steel and aluminum, for example. Suitable non-metallic substrates can include wood and paper-based substrates including particle board and cardboard, glass, ceramics, plastics and rubber, for example.

The present invention is described in further detail in ax connection with the following examples which illustrate/ simulate various aspects incvolved in the practice of the invention. It is to be understood that all changes that come within the spirit of the invention are desired to be protected and thus the invention is not to be construed as limited by these examples.

EXAMPLES

Comparative Example 1 (CE 1) and Example 1 (Ex. 1)

Ethylene acrylic acid resin was processed in a 27 mm co-rotating extruder having a two-strand die under the conditions identified in Table 2 below, with the processing of Ex. 1 done in accordance with the invention with the addition of $CO_2$ to the processing extruder while in CE 1 the resin was processed through the extruder without the addition of such process media fluid.

TABLE 2

|  | CE 1 | Ex. 1 |
| --- | --- | --- |
| Melt Temperature (°F.) | 325–400 | 324 |
| Melt Pressure (psi) | 400–600 | 210 |
| $CO_2$ Injection Pressure (psi) | — | 800–1000 |
| $CO_2$ Feed Rate (lbs/hr) | — | 3 |
| Output Rate (lbs/hr) | 30 | 30 |

The so formed powder coating compositions were then pelletized. The respective powder coating composition pellets were then cryogenically ground in a Retsch Ultra Centrifugal Mill. More specifically, the respective pellets were immersed in liquid nitrogen and fed to the mill with the entire product being ground. The mill included a 12 pin rotor and a screen with 1.0 mm openings. The product yield was the percentage of the amount of the originally provided resin which formed product than was ground to less than 250 microns (60 mesh), see TABLE 3, below.

TABLE 3

|  | CE 1 | Ex. 1 |
| --- | --- | --- |
| Product Yield (%) | 12 | 31 |

Discussion of Results

As shown in TABLE 3, a significantly higher yield was obtained when the thermoplastic-based powder coating was processed in accordance with the invention.

In addition, the grinding of pellets of conventionally prepared thermoplastic composition (CE 1) tended to result in extensive elongation rather than fracturing, with the particles being formed having "tails." It will be appreciated that the occurrence or presence of such tails can result in poor fluidization and handling during application of such a powder coating composition.

In contrast, the thermoplastic composition prepared in accordance with the invention (Ex. 1) appeared to have a higher tendency to fracture rather than tear and form a tail. As a result, such a prepared composition can facilitate handling and application.

Comparative Example 2 (CE 2) and Example 2 (Ex. 2)

In this comparative example and example, a hybrid powder coating formulation (i.e., a formulation containing both epoxy resin and carboxyl-functional polyester resin and specifically identified in TABLE 4, below) was extruded through a sheet die and then ground in the manner described below. More specifically, the hybrid formulations were processed in a 27 mm co-rotating extruder and discharged through a sheet die under the conditions identified in Table 5 below, with the processing of Ex. 2 done in accordance with the invention with the addition of $CO_2$ to the processing extruder.

TABLE 4

| IN-GREDIENT | IDENTIFICATION | SUPPLIER | WT. PERCENT |
|---|---|---|---|
| Epon 2002 | Bis A Epoxy | Shell Chemical | 24 |
| Rucote 551 | Carboxyl Polyester | Ruco Chemical | 24 |
| P-67 | Polyacrylate flow modifier | Estron Chemical | 0.7 |
| Benzoin | Flow modifier | DSM | 0.4 |
| DT-3329 | Matting agent | Ciba-Geigy | 1.6 |
| R-902 | Titanium oxide | DuPont | 39 |
| Minex | Silicate filler | Indusmin | 10 |
| Toner | Pigments | | 0.3 |

TABLE 5

| | CE 2 | Ex. 2 |
|---|---|---|
| Melt Temperature (°F.) | 120 | 111 |
| Melt Pressure (psi) | 2480 | 1320 |
| Extrudate Temperature (°F.) | 255 | 222 |
| $CO_2$ Injection Pressure (psi) | — | 1300 |
| $CO_2$ Feed Rate (lbs/hr) | — | 2.4 |
| Output Rate (lbs/hr) | 50 | 50 |

The so formed powder coating composition sheets were then flaked.

The respective powder coating composition flakes were then fed to the mill with the entire product being ground. The product yield was the percentage of the amount of the originally provided resin which formed product which passed through a 140 mesh screen.

The extrudate temperature was measured using an optical pyrometer.

The flowability of the powder coating material resulting from Ex. 2 was also compared to that of the powder coating material resulting from CE 2 in the following manner:

1. A cylindrical pellet, ½" (12.7 mm) in diameter by 6 mm in length, was pressed from the material being tested.
2. The pellet was then pressed, using as little pressure as possible and releasing immediately, onto a hot (375° F.) electric cure plate set at a 35 ° angle.
3. The pellet was then allowed to melt. At a time interval of five minutes after the pellet first contacted the plate, the length of the melt flow was measured using a steel rule. The length of the respective melt flows for CE 2 and Ex. 2 are provided in TABLE 6 below.

TABLE 6

| | CE 2 | Ex. 2 |
|---|---|---|
| Product Yield (%) | 50 | 74 |
| Melt Flow (mm) | 25 | 35 |

Discussion of Results

It is evident from the large pressure drop in melt pressure that the addition of the $CO_2$ in Ex. 2 is reducing the viscosity of the resin being processed which in turn reduces the pressure at the die as the lower viscosity material can more easily exit through the sheet die. In addition, the higher yield obtained in Ex. 2, compared to that obtained in CE 2, demonstrates that the material processed in accordance with the invention was more easily processed.

The flow data confirms that the reduction in temperature associated with the practice of the processing of the invention (e.g., addition of $CO_2$ as a process media during extrusion) will reduce the extent of cure reaction or B staging in the extruder and result in a product having better flow characteristics, which in turn generally translates into a smoother coating.

Example 3 (Ex. 3)—PROCESSING CRYSTALLINE MATERIALS

In accordance with the invention, a crystalline thermoset polyester-containing formulation (identified in TABLE 7, below) was processed through an extruder under the conditions defined in TABLE 8 below.

TABLE 7

| IN-GREDIENT | IDENTIFICATION | SUPPLIER | WT. PERCENT |
|---|---|---|---|
| Pioester | Unsat. crystalline polyester | Pioneer | 77 |
| P-67 | Polyacrylate flow modifier | Estron Chemical | 1.0 |
| Luperco 231-XL | Peroxy ketal | Pennwalt | 1.5 |
| Irgacure 184 | Acetophenone | Ciba-Geigy | 0.8 |
| R-902 | Titanium dioxide | DuPont | 19.7 |

TABLE 8

| | Ex. 3 |
|---|---|
| Melt Temperature (°F.) | 94 |
| Melt Pressure (psi) | 950 |
| $CO_2$ Injection Pressure (psi) | 800–1000 |
| $CO_2$ Feed Rate (lbs/hr) | 1 |
| Output Rate (lbs/hr) | 30 |

Discussion of Results

This example demonstrates that the invention permits and facilitates the extrusion processing of crystalline materials.

It is to be appreciated that conventional extrusion processing typically is not useful in connection with crystalline materials. In conventional extrusion processing, it is believed that as the crystalline material melts, the viscosity of the material rapidly decreases rendering the material difficult or incapable of being so handled or processed. In contrast and in accordance with the invention, it is theorized that the addition of the process media fluid reduces the viscosity of the process stream and thus permits the material to be processed through the extruder while only partially melted.

Thus, the continuous processing of powder coating compositions in accordance with the invention can afford a number of advantages including, for example:

a.) providing improved product consistency;
b.) providing improved processing of fast curing compositions;
c.) simplify, reduce or eliminate grinding processing required to form the final powder product form;
d.) facilitate formation and maintenance of seals required in and for such processing apparatus, thus avoiding the problems associated with prior art high pressure operation, such as identified above;
e.) providing desired processing flexibility where, for example, the process media can be added at one or more locations, as desired;

f.) providing simple and effective removal of the process media fluid from the powder coating precursor;

g.) permitting processing, such as occurs within an extruder, at relative low processing temperatures to permit and facilitate the use of temperature sensitive raw materials;

h.) preventing undesired curing of thermosettable resins in areas such as the pump seal area;

i.) allowing utilization of process media without any significant solubilization of the resin or other composition component;

j.) allowing utilization of process media having associated therewith significant solubilization of the resin or other composition component such as to form low viscosity solutions which, for example, can be sprayable such as to form regular spheres;

k.) allowing processing with co-solvents;

l.) providing a more easily friable foamed extrudate, capable of being reduced more controllably in particle size than typical flake extruder product; and m.) providing processing of semi-crystalline materials at temperatures low enough that unmmelted crystallites remain in the processed material.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In a method for producing a powder coating, the step of:

contacting a powder coating precursor stream comprising powder coating ingredients including at least one resin and at least one additional powder coating ingredient with a process media fluid effective to reduce the viscosity of the powder coating precursor stream and processing the powder coating precursor stream at a temperature no greater than the softening temperature of the resin, said process media fluid comprising a process media material in the form of a gas, wherein said powder coating precursor stream is processed in a continuous extruder.

2. The method of claim 1 wherein said powder coating precursor stream is processed at a temperature of at least about 10–20° F. below the softening temperature of the resin.

3. The method of claim 1 wherein said powder coating precursor stream is processed at a temperature of at least about 20–40° F. below the softening temperature of the resin.

4. The method of claim 1 wherein said process media fluid is selected from the group consisting of carbon dioxide, air, nitrogen and mixtures thereof.

5. The method of claim 1 wherein said contacting comprises the steps of:

adding the gas to the powder coating precursor stream in said continuous extruder, and extruding the powder coating ingredients with the gas.

6. The method of claim 1 wherein the powder coating precursor stream comprises the extrudate of a continuous extruder.

7. The method of claim 1 wherein the powder coating precursor stream comprises the feed to a continuous extruder.

8. The method of claim 1 comprising:

adding the process media fluid to the powder coating precursor stream in a continuous extruder, extruding the powder coating ingredients with the added process media fluid, and contacting the extrudate of the continuous extruder with additional process media fluid.

9. The method of claim 1 wherein the at least one resin of the powder coating ingredients is a thermoplastic resin.

10. The method of claim 9 wherein the thermoplastic resin is selected from the group consisting of polyphenylsulfones and PTFE.

11. The method of claim 1 wherein the at least one resin of the powder coating ingredients is a thermosettable resin.

12. The method of claim 1 wherein said powder coating precursor stream is processed in a continuous extruder to form a foam mass, said method additionally comprising the step of:

grinding the foam mass to form powder coating particles.

13. The method of claim 1 wherein, subsequent to said contacting step, said method additionally comprises the step of heating the powder coating precursor stream contacted with the process media fluid.

14. The method of claim 13 wherein said heating step comprises passing the powder coating precursor stream contacted with the process media fluid through a heated nozzle.

15. The method of claim 1 wherein said resin is crystalline.

16. In a method for producing a powder coating, the steps of:

contacting a powder coating precursor stream comprising powder coating ingredients including at least one resin and at least one additional powder coating ingredient with a process media fluid effective to reduce the viscosity of the powder coating precursor stream and processing the powder coating precursor stream at a temperature no lower than the softening temperature of the resin, said process media fluid comprising a process media material in the form of a fluid selected from the group consisting of supercritical fluids, gases, and liquified gases; and heating the powder coating precursor stream in contact with the process media fluid, wherein said powder coating precursor stream is processed in a continuous extruder.

17. The method of claim 16 wherein said powder coating precursor stream is processed in a continuous extruder at a temperature no greater than the softening temperature of the resin.

18. The method of claim 16 wherein said powder coating precursor stream is processed at a temperature of at least about 10–20° F. below the softening temperature of the resin.

19. The method of claim 16 wherein said powder coating precursor stream is processed at a temperature of at least about 20–40° F. below the softening temperature of the resin.

20. The method of claim 16 wherein said process media fluid is selected from the group consisting of carbon dioxide, air, nitrogen, and mixtures thereof.

21. The method of claim 16 wherein said contacting comprises the steps of:

adding the process media material to the powder coating precursor stream in a continuous extruder, and extruding the powder coating ingredients with the process media material.

22. The method of claim 16 wherein the powder coating precursor stream comprises the extrudate of a continuous extruder.

23. The method of claim 16 wherein the powder coating precursor stream comprises the feed to a continuous extruder.

24. The method of claim 16 comprising:

adding the process media material to the powder coating precursor stream in a continuous extruder, extruding the powder coating ingredients with the added process media material, and contacting the extrudate of the continuous extruder with additional process media fluid.

25. The method of claim 16 wherein the at least one resin of the powder coating ingredients is a thermoplastic resin.

26. The method of claim 25 wherein the thermoplastic resin is selected from the group consisting of polyphenylsulfones and PTFE.

27. The method of claim 16 wherein said resin is crystalline.

28. The method of claim 16 wherein the at least one resin of the powder coating ingredients is a thermosettable resin.

29. The method of claim 16 wherein said powder coating precursor stream is processed in a continuous extruder to form a foam mass, said method additionally comprising the step of:

grinding the foam mass to form powder coating particles.

30. In a method for producing a powder coating wherein powder coating raw materials including at least one resin and at least one additional powder coating ingredient are fed to and processed in a continuous extruder to disperse the at least one additional ingredient with the at least one resin to form an extrudate product, the step of:

adding a process media fluid comprising a process media material in the form of a gas to a process stream of at least one of the following:

a.) raw materials fed to the continuous extruder;

b.) raw materials processed in the continuous extruder; and c.) the extrudate product of the continuous extruder, said addition being effective to reduce the viscosity of the selected process stream to allow processing of the process stream at a temperature no greater than the softening temperature of the resin.

31. The method of claim 30 wherein, subsequent to said contacting step, said method additionally comprises the step of heating the powder coating precursor in contact with the process media fluid.

32. The method of claim 31 wherein said heating step comprises passing the powder coating precursor stream contacted with the process media fluid through a heated nozzle.

33. The method of claim 30 additionally comprising the step of statically mixing extrudate product of the continuous extruder.

34. In a method for producing a powder coating wherein powder coating raw materials including at least one resin and at least one additional powder coating ingredient are fed to and processed in a continuous extruder to disperse the at least one additional ingredient with the at least one resin to form an extrudate product, the steps of:

adding a process media fluid comprising a process media material in the form of a fluid selected from the group consisting of supercritical fluids, gases, and liquified gases to a process stream of at least one of the following:

a.) raw materials fed to the continuous extruder;

b.) raw materials processed in the continuous extruder; and c.) the extrudate product of the continuous extruder, said addition being effective to reduce the viscosity of the selected process stream to allow processing of the process stream at a temperature no greater than the softening temperature of the resin; and heating the powder coating precursor in contact with the process media fluid.

35. The method of claim 34 wherein said powder coating precursor stream is processed in the continuous extruder at a temperature of at least about 10–20° F. below the softening temperature of the resin.

36. The method of claim 34 wherein said powder coating precursor stream is processed in the continuous extruder at a temperature of at least about 20–40° F. below the softening temperature of the resin.

37. The method of claim 34 wherein the process media fluid is selected from the group consisting of supercritical fluids and liquified gases.

38. The method of claim 34 additionally comprising the step of adding a co-solvent to a process stream comprising at least one of the following:

a.) raw materials fed to the continuous extruder;

b.) raw materials processed in the continuous extruder; and c.) the extrudate product of the continuous extruder.

39. The method of claim 34 wherein said process media fluid is selected from the group consisting of carbon dioxide, air, nitrogen, and mixtures thereof.

40. A method for producing a powder coating, said method comprising the steps of:

extruding a premixed blend of powder coating raw materials including at least one thermosetting resin and at least one curing agent for the at least one thermosetting resin to form an extrudate product;

feeding a stream of the extrudate product through a left pump to form a stream of extrudate product at increased pressure;

wherein at least one of the blend of powder coating raw materials undergoing extrusion and the stream of extrudate product at increased pressure is contacted with a process media fluid selected from the group consisting of supercritical fluids, gases, and liquified gases, the process media being effective to reduce the viscosity of the materials of the selected process stream to allow processing at a temperature no greater than the softening temperature of the resin;

heating the extrudate product in contact with said process me spray drying the stream of extrudate product at increased pressure to form the powder coating.

41. The method of claim 40 wherein said powder coating precursor stream is processed in a continuous extruder at a temperature of at least about 10–20° F. below the softening temperature of the resin.

42. The method of claim 40 wherein said powder coating precursor stream is processed in a continuous extruder at a temperature of at least about 20–40° F. below the softening temperature of the resin.

43. The method of claim 40 wherein the process media fluid is selected from the group consisting of supercritical fluids and liquified gases.

44. The method of claim 40 wherein said process media fluid is selected from the group consisting of carbon dioxide, air, nitrogen, and mixtures thereof.

45. The method of claim 40 additionally comprising the step of applying an additional quantity of the process media fluid to seals in said melt pump to keep such seals free of the powder coating materials being processed.

46. The method of claim 40 wherein the heating step comprises passing the powder coating precursor stream in contact with the process media fluid through a heated nozzle.

47. The method of claim 40 additionally comprising the step of statically mixing the process media with the stream of extruded product at increased pressure.

48. The method of claim 4 wherein said process media fluid is carbon dioxide.

49. The method of claim 20 wherein said process media fluid is carbon dioxide.

50. The method of claim 39 wherein said process media fluid is carbon dioxide.

51. The method of claim 40 wherein said process media fluid is carbon dioxide.

* * * * *